Figure 1:
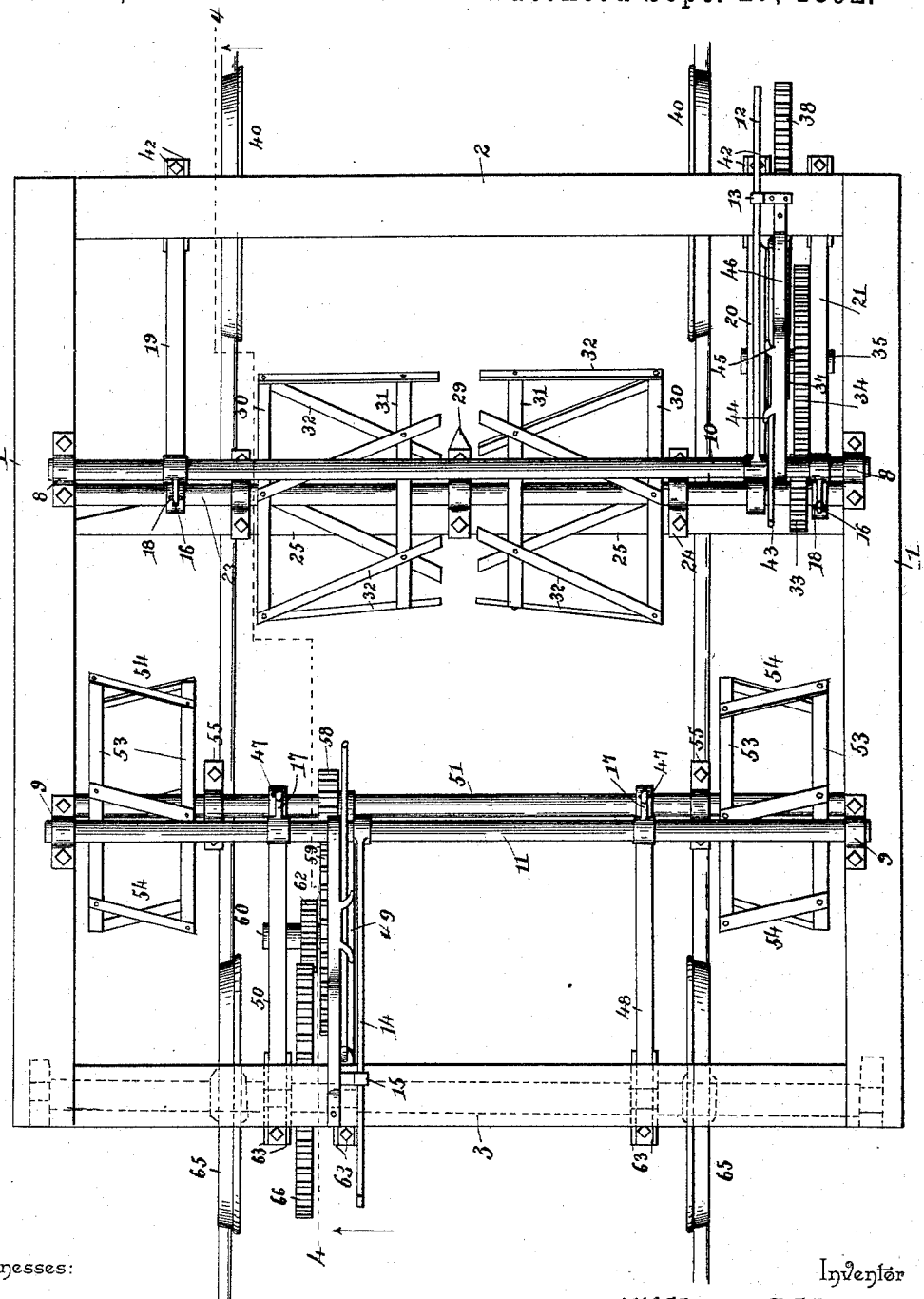

(No Model.) 4 Sheets—Sheet 1.

W. G. HAY.
WEED CUTTER FOR RAILROAD TRACKS.

No. 483,150. Patented Sept. 27, 1892.

Witnesses:
Jas. K. McCathran
W. S. Duvall

Inventor
William G. Hay
By his Attorneys,
C. A. Snow & Co.

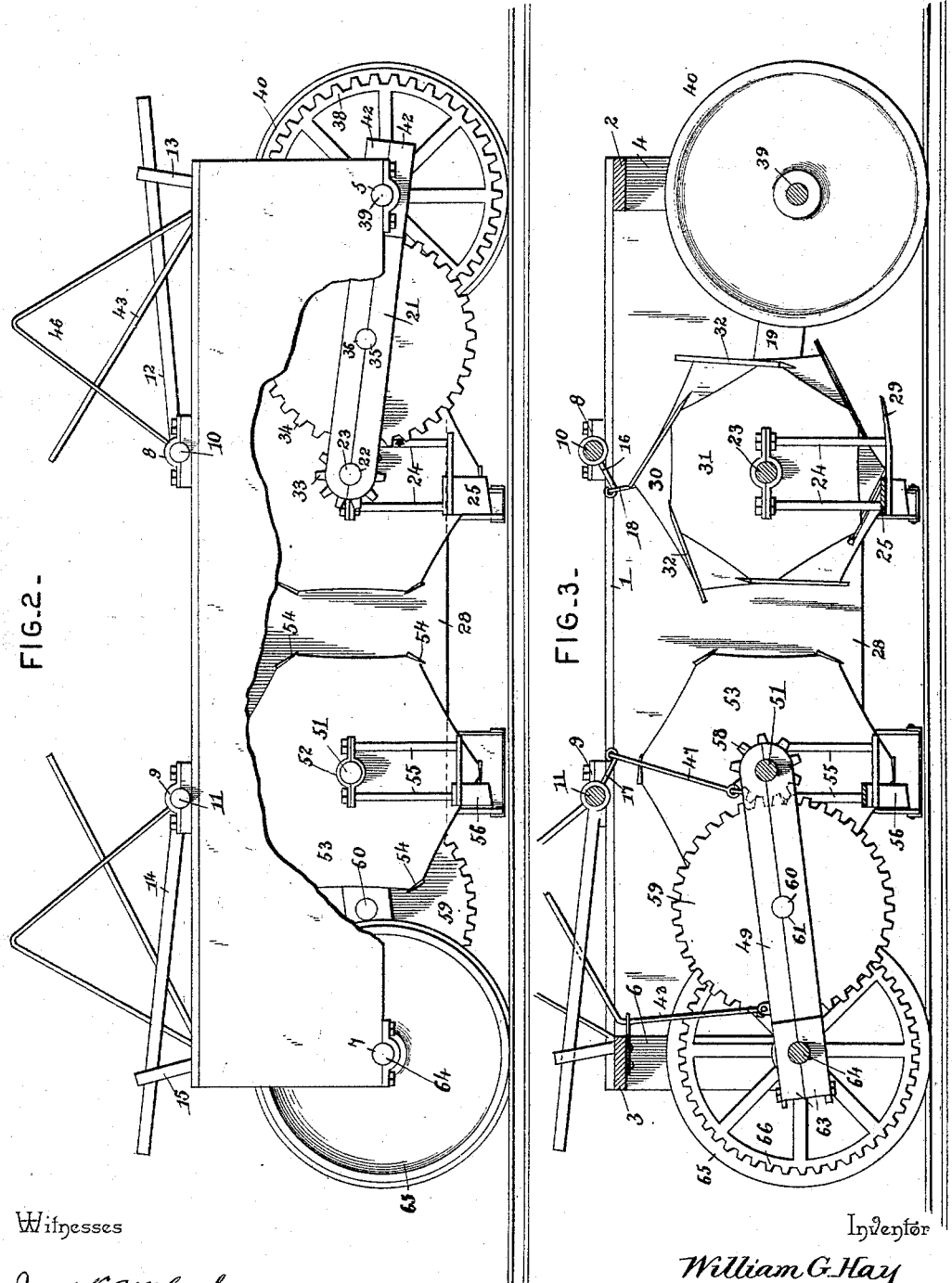

(No Model.) 4 Sheets—Sheet 3.
W. G. HAY.
WEED CUTTER FOR RAILROAD TRACKS.
No. 483,150. Patented Sept. 27, 1892.
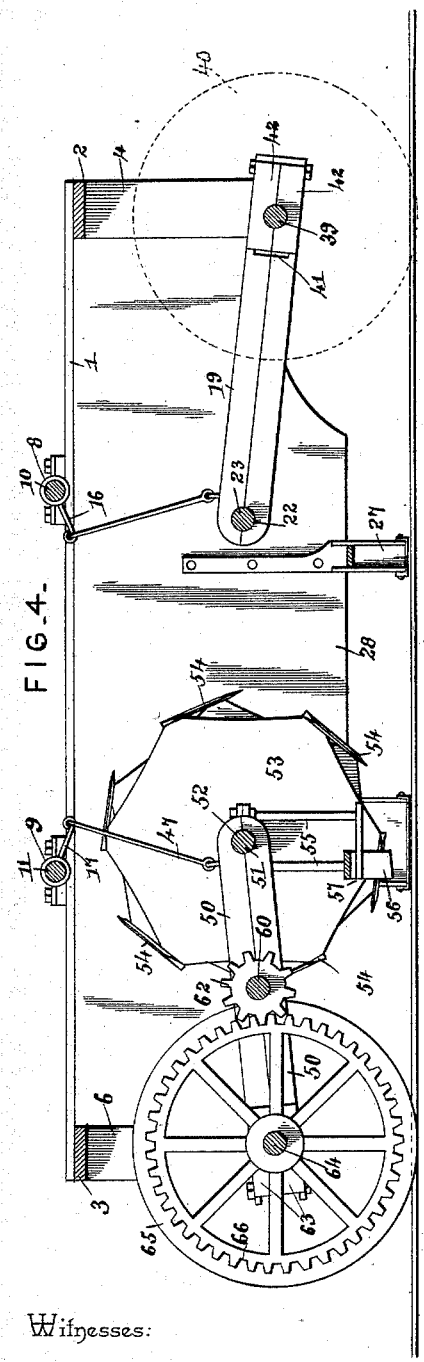
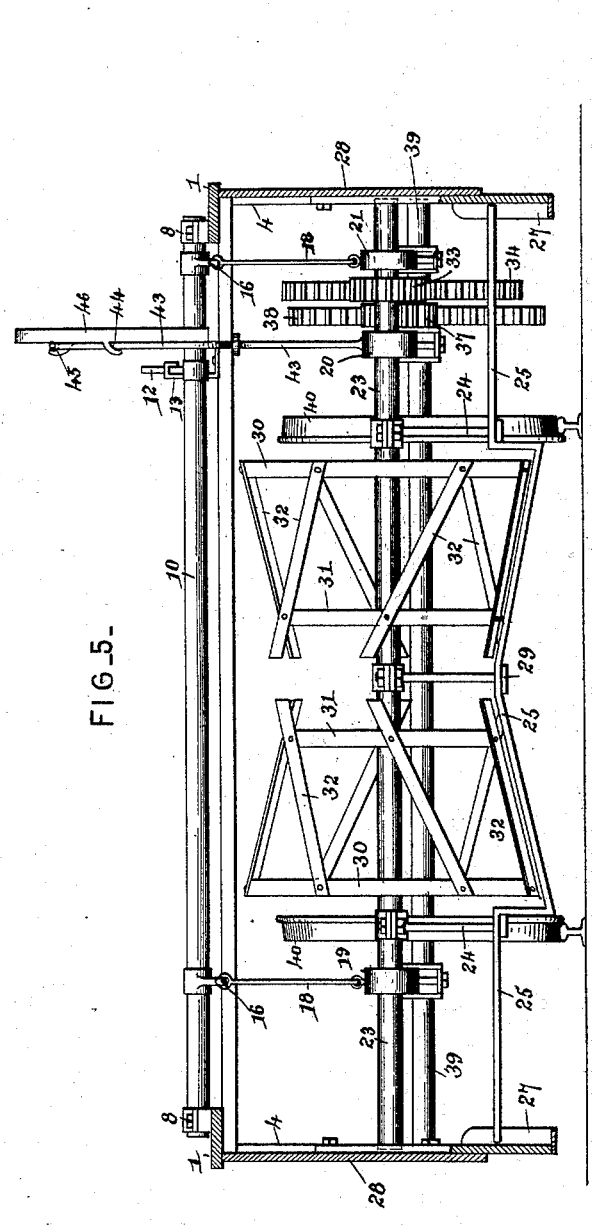
Witnesses:
Jas. K. McCathran
W. S. Duvall
Inventor
William G. Hay
By his Attorneys,
C. A. Snow & Co.

(No Model.) 4 Sheets—Sheet 4.
W. G. HAY.
WEED CUTTER FOR RAILROAD TRACKS.
No. 483,150. Patented Sept. 27, 1892.
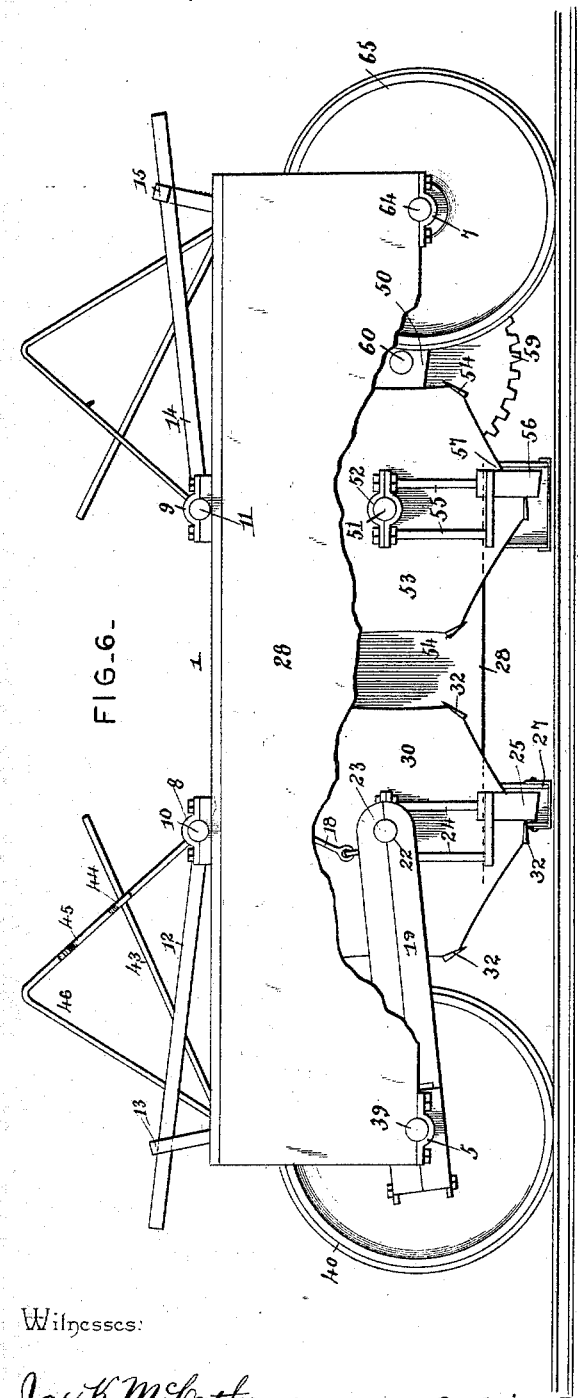
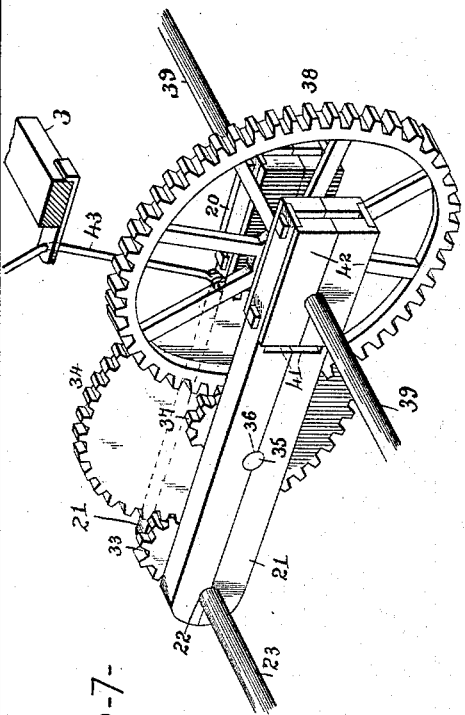
Witnesses:
Jas. K. McCathran
W. S. Duvall
Inventor
William G. Hay
By his Attorneys,
C. A. Snow & Co.

UNITED STATES PATENT OFFICE.

WILLIAM G. HAY, OF CONCORDIA, KANSAS.

WEED-CUTTER FOR RAILROAD-TRACKS.

SPECIFICATION forming part of Letters Patent No. 483,150, dated September 27, 1892.

Application filed July 6, 1891. Serial No. 398,559. (No model.)

*To all whom it may concern:*

Be it known that I, WILLIAM G. HAY, a citizen of the United States, residing at Concordia, in the county of Cloud and State of Kansas, have invented a new and useful Weed-Cutter for Railroad-Tracks, of which the following is a specification.

This invention relates to a weed and grass cutter for removing weeds and grass from between and at the sides of railroad-tracks.

The objects of the invention are to provide a machine of cheap and simple construction adapted to be mounted upon railroad-tracks and to efficiently remove the weeds, grass, and other vegetable growth located between and at the sides of the rails, and to provide means for regulating the depth of cut and for throwing the cutting mechanism and driving mechanism out of gear or operative position.

Other objects and advantages of the invention will appear in the following description, and the novel features thereof will be particularly pointed out in the claims.

Referring to the drawings, Figure 1 is a plan of an apparatus constructed in accordance with my invention. Fig. 2 is a side elevation. Fig. 3 is a central vertical longitudinal section. Fig. 4 is a longitudinal section, the same being taken on the lines 4 4 of Fig. 1. Fig. 5 is a transverse section. Fig. 6 is a side elevation. Fig. 7 is a detail in perspective of a pair of the gear-carrying arms.

Like numerals of reference indicate like parts in all the figures of the drawings.

In practicing my invention I employ a suitable framework, which may or may not be constructed after that shown herein, as the same is susceptible to many changes in detail. In the present instance, however, I employ a pair of opposite longitudinal side bars 1, connecting the same at their front ends by a cross-bar 2 and at their rear ends by a rear cross-bar 3. Depending from the corners of the frame thus constructed is a front pair of standards 4, terminating at their lower ends in bearings 5, and a rear pair of standards 6, terminating at their lower ends in bearings 7. The side bars 1 have mounted at opposite points near their front ends bearings 8 and near their rear ends bearings 9. In the bearings 8 a rock-shaft 10 is journaled and in the bearings 9 a rock-shaft 11 is journaled. From the rock-shaft 10 extends a rocking lever 12, the free end of which is designed to engage with a locking-standard 13, mounted upon the front cross-bar 2, and from the rock-shaft 11 extends a rocking lever 14, the free rear end of which is designed to engage removably with a locking-standard 15. The rock-shaft 10 has secured near its ends a pair of rock-arms 16, while the rock-shaft 11 has a corresponding pair of rock-arms 17, but located inside of the rock-arms 16. From the extremities of the rock-arms 16 depend connecting-rods 18, the lower ends of which are connected to the two outer of a series of three bars, designated as 19, 20, and 21, the latter two being located at one side of the framework and the former or first-mentioned bar being located at the opposite side. These three bars are provided at their corresponding outer ends with transverse bearings 22, all of which align and form a support for the rotatable cutter-shaft 23, reduced at those points which take bearing in the bars or arms. At intervals there depends from the shaft 23 stirrups 24, to the lower ends of which is securely bolted the transverse stationary cutter-bar 25. The center of the cutter-bar 25 is slightly elevated, so as to conform to the shape of the road-bed in cross-section between the rails, while at its ends said bar is upwardly and outwardly bent in a manner adapting it to clear the rails, and has its extremities located in vertical slots or ways 27, located upon the inner surfaces of the side walls 28 of the machine. At the center of the bar 25 a guiding-finger or deflector 29 is secured and extends forwardly, as shown. At each side of the finger and of the center of the shaft 23 there is located upon the latter a pair of polygonal heads 30 and 31, the latter, occurring between the heads 30, being smaller or of less diameter and having their angles alternating with those of said heads 30. The angles of each pair of heads are connected by inclined diagonally-disposed knives 32, the relative location of the angles of the disks and their relative sizes serving to effect the inclination and general disposition of the knives. Between the arms 20 and 21 there is mounted rigidly upon the shaft 23 a small gear 33, and the same engages and when operated, is driven by a large gear 34, mounted upon a transverse shaft 35, journaled in a pair of opposite transverse bearings 36, formed in the arms 20 and 21. A small gear 37 is mounted upon the shaft 35, adjacent to the gear 34, and in turn is driven by a master-gear 38, which is mounted upon an axle 39, journaled at its ends in the bearings 5 of the standards 4 at the front end of the framework. Between the arms 19 and 20 the axle 39 has mounted thereon flange-wheels 40, designed to conform to the shape of the usual track-rail. Each of the arms 19, 20, and 21 is provided at its front end and at opposite sides with ways or recesses 41, and in the same there are mounted for movement bearing boxes or blocks 42, sectionally divided and embracing the upper and lower halves of the axle 39, so that the axle, being stationary so far as any lateral movement is concerned, is enabled to support the front ends of the bars 19, 20, and 21 and yet permit of a reciprocatory movement of said bars, whereby the small gear 37 is thrown out and into engagement with the master-gear 38 at will. Such movement upon the parts of the bars 19, 20, and 21 is attained through the medium of a bent or bell-cranked lever 43, fulcrumed on the cross-bar at the end of the machine and extending from the arm 20 to a point above the framework and adapted at its upper end to engage with a front or a rear notch 44 and 45, respectively, formed in the inner edge of an inverted-V-shaped locking-standard 46, the ends of which are secured to the front bar 2 and shaft 10.

The construction of the rear half of the machine is almost a counterpart of that just described as being located at the front half, the only changes made being the difference of location of the rotary cutters, whereby they are adapted to eradicate the weeds, grass, and vegetable growth at each side of the track instead of between the rails. Depending from the rock-arms 17 of the rear shaft 11 is a pair of rods 47, and the same are secured at their lower ends to the two outer of a series of three arms or bars, designated as 48, 49, and 50, the latter two being located adjacent to each other at one side of the center of the shaft and the former at the opposite side thereof. Near the outer ends of a shaft 51, which is loosely journaled in bearings 52, formed in the rear ends of the arms 48, 49, and 50, there are mounted opposite pairs of disks or heads 53, the same being polygonal and having their angles alternately located with relation to each other and connected by diagonally-disposed knives or cutters 54. From the shaft 51 there depend adjacent to the rotary cutters just mentioned stirrups 55, and securely bolted to the same is a transverse stationary cutter 56, which near its ends is dropped to pass under the rotary cutters and terminates in a pair of vertical ways 57, located at the inner sides of the side walls 28. Between the arms 49 and 50 there is mounted upon the shaft 51 a small pinion 58, which is engaged and driven by a large gear 59, mounted upon a short transverse shaft 60, located in bearings 61, formed in the arms 49 and 50, and also carrying a small gear 62. The rear ends of the arms 48, 49, and 50 are recessed to receive bearing-blocks 63, which are mounted for sliding in the recesses, and journaled in these blocks is the rear axle 64 of the machine, the extremities of the axle being journaled in the bearings 7 at the lower ends of the opposite vertical standards 6 of the framework. The axle 64 carries a pair of ordinary flanged car-wheels 65, the peripheries of which conform to the shape or style of track employed, and at intervals agreeing with the bearing blocks or boxes 63 and the bearings 7 said axle is reduced, as shown. This completes the construction of the machine, and the operation, though at once apparent from the foregoing description, may be briefly stated as follows: The machine is moved by any suitable means, either horse-power or by an engine, and as the wheels 40 and 65 are rotated motion is imparted by their axles to the master-gears 38 and 66, and from them motion is imparted through the medium of the gears 58, 59, and 62 and 34, 37, and 33 to the cutter-shafts 51 and 23, so that the rotary cutters are rapidly rotated, the knives arriving in a slanting manner against the stationary cutter-bar, thus forming a shear cut and removing the grass, weeds, and other growth that has grown between or at the sides of the rails. The front cutters or knives are, as shown, extended at their inner ends beyond the inner heads or disks 31 and are adapted to cut beyond the same, as will be apparent. The pointed deflector, located between the two inner heads 31, serves to deflect or guide the grass, &c., to the paths traveled by the extended portions or ends of the knives, so that there is no portion but what is closely cropped or cut as the machine travels thereover. By grasping the two levers 14 and 12 and raising the same the cutters are dropped into operative position, and by lowering the free ends of the levers said cutters are elevated and maintained in such elevation by the locking-standards 13 and 15. By manipulating the front and rear levers 43 the gearing for operating the rotary cutters will be thrown into and out of connection with the master-gears of the axles and may be locked in either position in accordance with that notch of the standards 46 in which the levers are engaged.

Having described my invention, what I claim is—

1. In a track-cleaner of the class described, the combination, with the truck or frame, the transverse rock-shaft, the lever for operating the same, and the rock-arms depending from the shaft, of the transverse cutter-shaft, connections between the rock-arms and cutter-shaft, the rotary cutters mounted thereon, the stationary transverse cutter-bar, the axle having the wheels, the arms pivoted on the axle and on the cutter-shaft, and the train of gearing between the axle and the cutter-shaft, substantially as specified.

2. In a track-cleaner of the class described, the combination, with the framework, the transverse rock-shaft, the lever for rocking the same, the rock-arms extending from the rock-shaft, the depending connecting-rods, the cutter-shaft, the rotary cutters mounted thereon, the stationary cutter-bar located under the rotary cutters, the arms pivoted to the cutter-shaft, and the boxes mounted for sliding in the free ends of the arms, of the axle journaled on the frame, the wheels mounted on the axle, said axle being also journaled in the sliding boxes, the gear mounted on the cutter-shaft, the master-gear mounted on the axle, the intermediate gears between the master-gear and that of the shaft, the lever mounted upon the arms and adapted to reciprocate the same, and means for locking the lever, substantially as specified.

3. In a track-cleaner of the class described, the combination, with the truck, the transverse rock-shaft, the lever for operating the same, and the rock-arms extending from the rock-shaft, of a cutter-shaft mounted for rotation and connected with the rock-arms, the rotary cutters mounted on the shaft, the stirrups depending from the shaft, and the stationary cutter-bar located in the stirrups and having its ends mounted for vertical movement in ways located at the inner sides of the truck, substantially as specified.

4. In a track-cleaner of the class described, the combination, with the truck, the rotatable cutter-shaft, and means for rotating the same, of rotary cutters located upon the shaft and adapted to depend at opposite sides of a track and a stationary cutter-bar extending transverse the track and depressed at those portions occurring underneath the rotary cutters, substantially as specified.

5. In a track-cleaner of the class described, the combination, with the rotatable cutter-shaft and means for driving the same, of opposite pairs of polygonal heads, the inner head of each pair being the smallest, inclined cutters or blades connecting each pair of heads and extending at their inner ends beyond the inner heads, the transverse stationary cutter-bar convexed at its center to agree with the inclination of the cutters or blades, and the central pointed deflector secured to the cutter-bar and extended forwardly underneath and between the cutters, substantially as specified.

In testimony that I claim the foregoing as my own I have hereto affixed my signature in presence of two witnesses.

WILLIAM G. HAY.

Witnesses:
HOMER KENNETT,
ISAAC DIMMICK.